United States Patent Office 3,516,785
Patented June 23, 1970

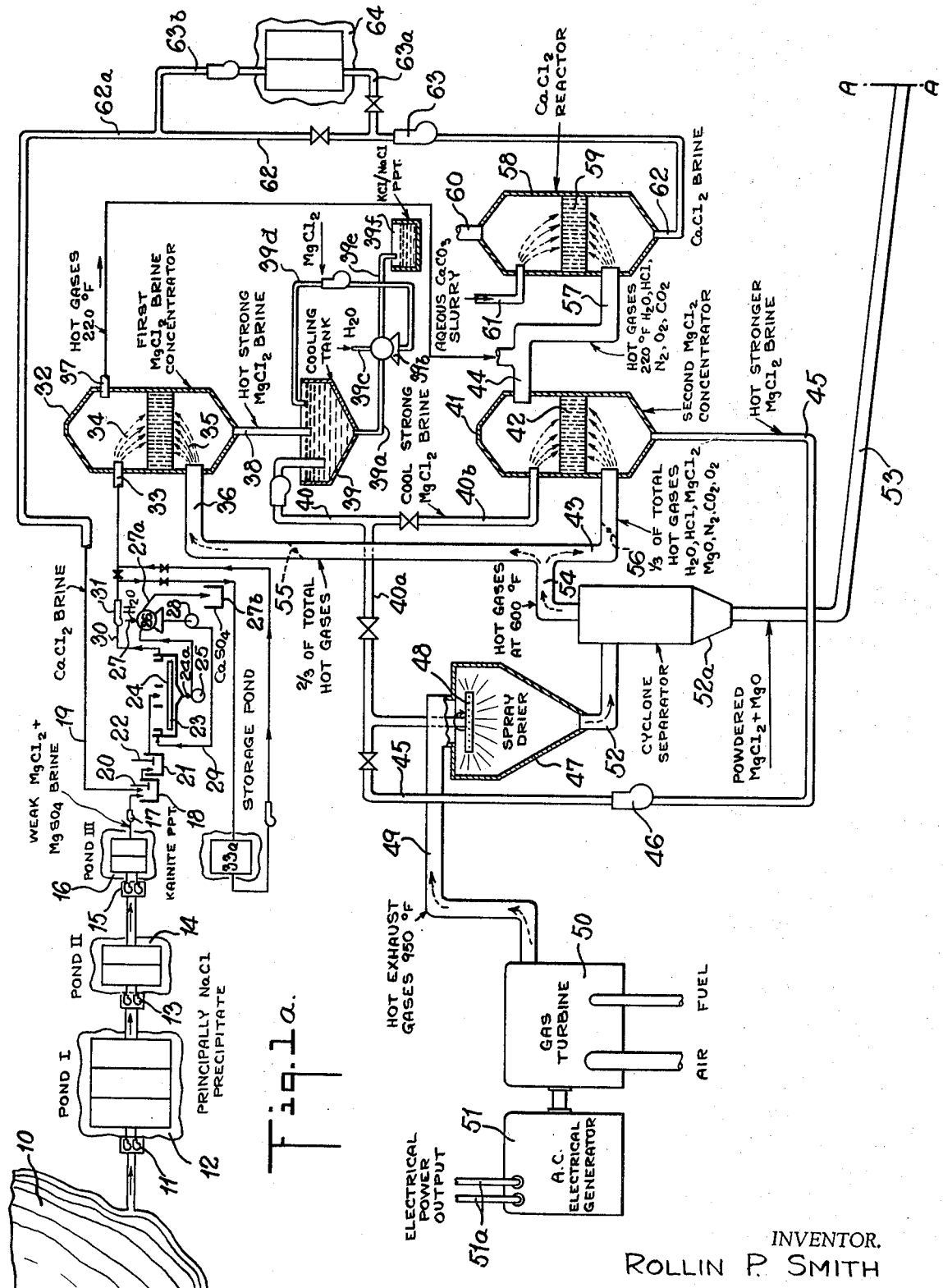

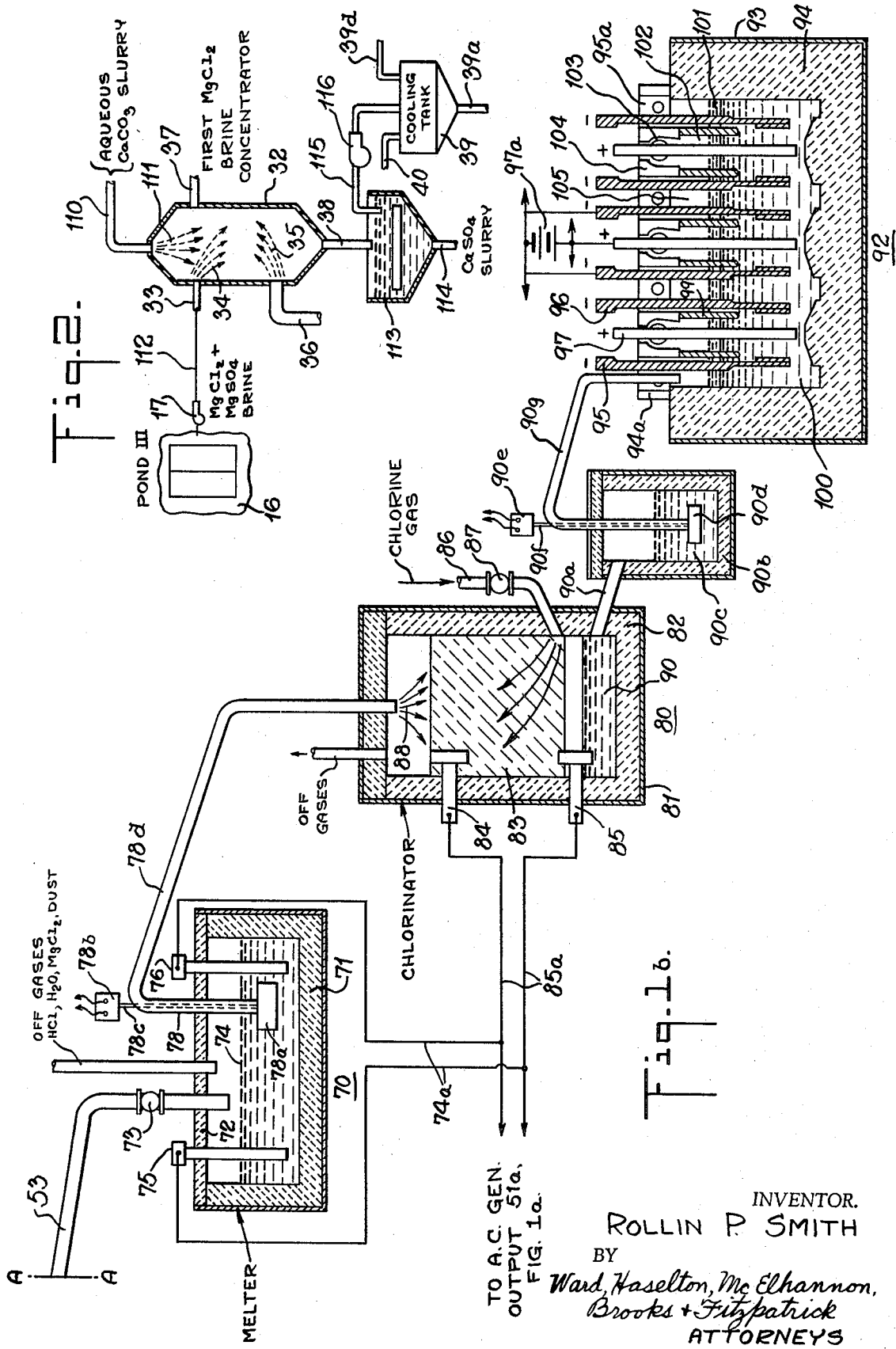

---

3,516,785
METHOD FOR SELECTIVE RECOVERY OF MAGNESIUM CHLORIDE FROM MIXED SALT SOLUTIONS
Rollin P. Smith, New Canaan, Conn., assignor to National Lead Company, New York, N.Y., a corporation of New Jersey
Filed June 14, 1967, Ser. No. 646,079
Int. Cl. C01f 5/26, 5/30, 5/32
U.S. Cl. 23—91        7 Claims

ABSTRACT OF THE DISCLOSURE

Process for recovery of magnesium chloride from sodium, potassium, magnesium, chloride and sulfate containing mixed salt solutions, by successive concentrations to precipitate predominantly first sodium salts and thence potassium-magnesium double salts, desulfating the mother liquor with calcium chloride and further concentrating to precipitate the potassium-magnesium double salt, carnallite, subjecting the resultant essentially magnesium chloride solution to further and/or final concentrations to dryness with gaseous heat, employing the heated HCl-containing off-gases from said final concentration for said further concentrations and for reaction with said calcium carbonate to produce calcium chloride for said desulfating treatment.

---

This invention pertains to the selective recovery of salts from aqueous salt solutions containing a plurality of water-soluble salts, such as the chlorides and/or sulfates of sodium, potassium, magnesium, etc. The invention is more particularly concerned with the selective recovery of magnesium chloride from naturally occurring brines as found in the oceans, inland seas, salt lakes, salt wells and the like, disposed about the earth's surface. As by-products of the magnesium chloride recovery process of the invention, potassium values may also be recovered as well as calcium sulfate.

Such brines, as aforesaid, in general contain sodium chloride as the major constituent, together with lesser but nevertheless substantial amounts of the chlorides and/or sulfates of potassium and magnesium as the principal remaining salts.

Although such salts are important industrially as well as necessary to all forms of life, their isolation and recovery from naturally occurring brines is in many instances not the most economical way of obtaining the same as compared to other sources of supply because problems of selective recovery of desired salts from the brines are in general involved and also in general, evaporation of the aqueous solvent in successive stages, which is quite expensive except where waste heat from industrial plants is available or where solar evaporation may be employed.

Where, however, solar evaporation is available throughout a substantial portion of the year and where the concentration of salts in the naturally occurring brine source is high, it becomes commercially feasible to recover therefrom in accordance with the invention, such strategically important salts as magnesium chloride for use in the production of chlorine gas and metallic magnesium by electrolysis, and optionally also potassium sulfate for use as a fertilizer among other applications.

Natural brines containing small amounts of potassium chloride can as a rule be evaporated to produce a mixed concentrate crystallization of potassium chloride and sodium chloride. However, if the brine contains more than a specific amount of sulfate and magnesium ions, it then becomes a problem of great intricacy to recover the magnesium or potassium salts. A typical example of this is the brine of the Great Salt Lake in Utah, which contains relatively high amounts of sulfate and magnesium ions. As a result, if the original brine from the lake is evaporated until most of the sodium chloride has precipitated and the mother liquor is drawn off and further evaporated until a saturated solution of magnesium salts has been obtained, it will be found that the potassium salts have precipitated more or less completely as potassium-magnesium double salts, and that kainite ($KCl \cdot MgSO_4 \cdot 3H_2O$) is the essential potassium-containing double salt which precipitated. The balance of the salts contained in the precipitate are found to consist essentially of sodium chloride together with small amounts of other magnesium and potassium salts. The mother liquor which is left over from this precipitation is primarily magnesium sulfate and magnesium chloride in the proportions roughly of about 30% of the sulfate and 60% of the chloride.

Thus if the mother liquor from the kainite precipitating stage is drawn off and desulfated by reaction with calcium chloride and the resulting calcium sulfate precipitate removed, a brine consisting predominantly of magnesium chloride is obtained together with residual potassium and sodium chloride values. If now this brine is further concentrated, as by reacting in counterflow with hot gases at about 600° F. and allowed to cool, the residual potassium values will precipitate out as the double salt carnallite ($KCl \cdot MgCl_2 \cdot 6H_2O$) together with the residual NaCl values. The $MgCl_2$ values may be recovered from the carnallite by separating the precipitate from the mother liquor and treating with about ½ its weight of water, filtering and combining the filtrate with the mother liquor. The resultant concentrated $MgCl_2$ brine thus obtained may be then further concentrated by moisture evaporation and preheated in a counterflow of hot gases at about 600° F. and then spray dried to an essentially $MgCl_2$ powder with hot entering gases at about 900–1000° F.

In the spray drying operation a fraction of the $MgCl_2$ is decomposed by the hot moisture-laden gases, into MgO and HCl. The HCl-containing gases thus obtained may be reacted with a cheap source of calcium carbonate, such as oolitic sand, which abounds in the Great Salt Lake region, to produce calcium chloride, which may be employed for desulfation in the above mentioned desulfating stage.

The concentrating stages subsequent to solar evaporation, may economically be accomplished by hot waste gases from industrial operations, such as the exhaust gases from a gas turbine employed for driving an electrical generator employed as a power source for melting the magnesium chloride end product, for rechlorinating the magnesium oxide content thereof, and also for electrolyzing the resultant molten product into chlorine gas and metallic magnesium in the manner described in a copending application of F. E. Love, Ser. No. 556,108, filed June 8, 1966, of common ownership with the instant application, now U.S. 3,418,223, issued Dec. 24, 1968.

The potassium values from the kainite and from the carnallite precipitation stages, may be recovered as potassium sulfate by processing as described in a copending application of L. W. Ferris, Ser. No. 400,994, filed Oct. 2, 1964, also of common ownership with this application, now U.S. 3,432,258, issued Mar. 11, 1969.

The above and other features of the invention will now be described in detail by reference to the accompanying drawings in which: FIGS. 1a and 1b comprise a flowsheet of a preferred embodiment of the method according to the invention, FIG. 1b being a continuation of FIG. 1a along the line A—A; and in which FIG. 2 is a fragmentary diagrammatic showing of a modified embodiment of the invention.

Referring to FIG. 1a, a naturally occurring brine, such for example as that from the Great Salt Lake, as indicated at 10, is pumped as at 11, into a relatively large solar evaporating pond 12, wherein it is subjected to solar evaporation until salt precipitation occurs, which is found to consist principally of sodium chloride. The mother liquor is then pumped, as at 13, into a smaller pond 14, and again subjected to solar evaporation until salt precipitation occurs, which is again found to consist principally of sodium chloride. The mother liquor is then pumped, as at 15, into a smaller pond 16 and again subjected to solar evaporation until salt precipitation occurs, which in this instance is found to consist principally of the double salt, kainite ($KCl \cdot MgSO_4 \cdot 3H_2O$), with additional NaCl.

The mother liquor is pumped as at 17, thence into a reaction vessel 18, wherein the liquor is desulfated by reaction with calcium chloride brine supplied over conduit 19 from a source as hereinafter explained. The reaction vessel is provided with a motor-driven stirrer 20 for assuring complete reaction of all sulfate values present in the mother liquor, with the calcium chloride to form a slurry of calcium sulfate precipitate in an essentially weak magnesium chloride brine. This slurry flows thence by gravity into a second reaction vessel 21, provided with a motor-driven stirrer 22, to allow complete reaction, and thence into a settling tank 23, provided with a motor-driven rake 24. The calcium sulfate precipitate settles to the bottom of the tank and is drawn off as a slurry with a portion of the $MgCl_2$ brine, as at 24a, by means of pump 25, which pumps the slurry onto a rotary vacuum drum filter 26, on which the retained precipitate is washed with water, as at 27, and discharged, as at 27a into a container 27b as a product according to the invention. The filtrate is recycled by pump 28, over pipeline 29 into the settling tank for recovery of magnesium chloride values.

The mother liquor is drawn off from the settling tank 23 over line 30 by means of pump 31, and fed into the top of a first concentrator 32, as at 33, or alternatively is fed into a storage pond 33a and from thence into the concentrator. The mother liquor at this stage consists principally of a weak solution of magnesium chloride brine containing, however, substantial amounts of sodium and potassium chlorides and chloride salts of other salts initially present in the lake brine, such as lithium chloride, calcium chloride, etc. Concentrator 32 may, for example, be of the type which is provided about midway of its height, with a non-reactive, pervious packing, such as ceramic shapes, or the like, through which the brine spray introduced, as at 34, trickles down in counterflow to an updraft of hot gases injected below the packing, as at 35, from a pipeline 36, as hereinafter explained.

In the concentrator 32, a substantial fraction of the water content of the entering brine is evaporated and passes off with the exit hot gases through an outlet pipe at the top of the concentrator, as at 37, while the concentrated brine drains off at the base of the concentrator through drain line 38 into a cooling tank 39. In the cooling tank the brine is cooled substantially to ambient temperature as a result of which the potassium chloride values precipitate as the double salt, carnallite $$(KCl \cdot MgCl_2 \cdot 6H_2O)$$

along with residual NaCl values. A slurry of the carnallite is drawn off through a drain line 39a at the base of the tank and fed to a rotary drum vacuum filter 39b, washed with water, as at 39c, for displacing adhering mother liquor and for dissolving the $MgCl_2$ values of the carnallite, which are recycled into the cooling tank via line 39a. The washed carnallite precipitate containing KCl, NaCl and $MgCl_2$ values is flushed from the filter and delivered over line 39e to a storage tank 39f. This precipitate may be processed to recover the KCl in accordance with known techniques, as by flotation concentration.

The brine from the cooling tank is drawn off over conduit 40 and may be fed thence over a line 40a as explained below, or alternatively over a line 40b, into the top of a second concentration 41, similar to 32, wherein the entering brine is further concentrated by an inflow of hot gases injected beneath the packing 42 via pipeline 43. The upstream of moisture-laden hot gases exit from the concentrator over line 44 at the top, while the hot concentrated brine drains off at the base into drain line 45, from whence it is pumped, as at 46, into the top of a spray drier 47. Within the spray drier, pipe 46 terminates in a tangentially slotted, rotary spray nozzle which sprays the brine as indicated. Also into the top of the drier, hot gases are injected, supplied over a pipeline 49. These hot gases may be derived from any suitable source, but preferably are hot waste gases, such as the exhaust gases from a gas turbine 50 driving an alternating current electrical generator 51, having power output terminals 51a, such as is required for furnishing a substantial amount of electrical energy requirements of the overall process.

Such turbine gases exhaust at about 950° F. which is adequate for spray drying the $MgCl_2$ brine concentrate to a solid state hydrate powder, discharged from the base of the drier along with the hot gases through an outlet pipe 52, which discharges into a cyclone separator 52a, for separating the solids from the gases. The solids consisting essentially of the $MgCl_2$ powders containing about 1–5% MgO and 1–5% $H_2O$ plus minor amounts of chlorides of Na, K, Li, B, etc., from the original brine, are discharged from the base of the cyclone into a conduit 53, while the hot gases exit from the cyclone at about 600° F. into a flue 54. Flue 54 conects to flue pipes 36 and 43, provided with dampers 55 and 56, respectively, for variably adjusting the flow of gases therethrough. In accordance with the process heat requirements in the preferred embodiment of the instant invention the dampers are adjusted to channel about two-thirds of the hot gases from flue 54 through flue pipe 36 into the first primary concentrator 32 and the remaining one-third through flue pipe 43 into the second primary concentrator 41.

The moisture-laden hot exhaust gases exiting from the concentrators at about 220° F. via flues 37 and 44, are channeled into a common flue pipe 57, and thence into the lower portion of a secondary concentrator or reactor 58, constructed like the primary concentrators 32, 41 and having an intermediately disposed packing section 59 through which the gases pass upwardly to an outlet flue 60 at the top. An aqueous slurry of calcium carbonate, such as oolitic sand, is fed into the top of the reaction vessel via conduit 61, for reaction with the HCl values in the hot entering gases to produce a calcium chloride brine which drains into the outlet conduit 62 at the base of the reactor. The $CaCl_2$ brine may be used directly by pumping over line 62 via pump 63 and thence via line 62a into the desulfating tank 18, for desulfating the brine from pond 16, or alternatively, may be stored in a holding pond, as at 64, which will allow settling out of any insoluble matter for which purpose pipelines 63a, 63b to and from pond 64 are provided as shown.

Hydrochloric acid in the gases entering the reactor 58, via flue 57, is derived from reactions occurring in the spray drier 47, wherein a portion of the $MgCl_2$ is decomposed into MgO and HCl by reaction with $H_2O$ in the hot entering gases.

Upon analysis of the lake brine 10, it is found to contain in percent by weight of the total, the following constituents.

| Constituent: | Wt. percent of total |
|---|---|
| Mg | 0.77 |
| K | 0.43 |
| Na | 8.24 |
| Cl | 14.11 |
| $SO_4$ | 1.70 |
| $H_2O$ | 74.77 | together with fractional amounts of calcium, boron and lithium. Upon successive concentrations in Ponds I–III, inc., as above described, the mother liquor drawn off from Pond III, as at 17, is found to have the following analysis.

| Constituent: | Wt. percent of total |
|---|---|
| Mg | 7.5 |
| K | 0.9 |
| Na | 0.6 |
| Cl | 22.0 |
| $SO_4$ | 4.0 |
| Ca, Li, B | 0.37 |
| $H_2O$ | 65.4 |

After desulfating, the liquor fed into the first concentrator 32, as at 33, analyzes.

| Constituent: | Wt. percent of total |
|---|---|
| Mg | 8.3 |
| K | 1.0 |
| Na | 0.6 |
| Cl | 24.2 |
| $SO_4$ | 0.12 |
| Ca, Li, B | 0.37 |
| $H_2O$ | 65.4 |

The slurry precipitate discharged from the settling tank 39 via line 39a, analyzes.

| Constituent: | Wt. percent of total |
|---|---|
| Mg | 8.0 |
| K | 8.3 |
| Na | 4.0 |
| Ca, Li | 0.2 |
| $H_2O$ | 79.5 |

The mother liquor from the settling tank fed into concentrator 41 analyzes.

| Constituent: | Wt. percent of total |
|---|---|
| Mg | 9.0 |
| K | 0.18 |
| Na | 0.22 |
| Cl | 26.2 |
| $SO_4$ | 0.14 |
| Ca, Li, B | 0.50 |
| $H_2O$ | 63.0 |

The concentrated mother liquor fed from the second concentrator 41 into the spray drier 47 via line 45, analyzes.

| Constituent: | Wt. percent of total |
|---|---|
| Mg | 10.8 |
| K | 0.21 |
| Na | 0.26 |
| Cl | 31.5 |
| $SO_4$ | 0.16 |
| Ca, Li, B | 0.59 |
| $H_2O$ | 55.5 |

The spray dried product discharged from the cyclone 52a into container 53, analyzes.

| Constituent: | Wt. percent of total |
|---|---|
| $MgCl_2$ | 82.1 |
| MgO | 5.0 |
| $H_2O$ | 5.0 |
| KCl | 1.0 |
| NaCl | 1.6 |
| $CaCl_2$ | 2.9 |
| LiCl | 1.9 |
| B | 0.1 |
| Other | 0.4 |

Referring to the above data it will be seen that most of the sodium values are eliminated by the Ponds I and II concentrations. The same also applies to the Pond III concentration although this is not so apparent from a comparison of the initial lake brine and Pond III mother liquor by reason of the high initial water content of the lake brine as compared to the mother liquor. The data further shows that although the Pond III mother liquor contains a substantial percentage by weight of the sulfate radical, this is eliminated for all practical purposes at the desulfating stage. It will also be noted that the successive concentrations progressively increase the percentages of the magnesium and chlorine values, until in the final spray dried product, magnesium chloride constitutes about 82% of the total weight.

The combustible gas stream is used four times, i.e., first in the gas turbine 50, then for spray drying in the drier 47, then for concentration of the magnesium chloride brine in the concentrators 32 and 41, and finally for recovery of the HCl values in the calcium chloride reactor 58.

As above stated the cold brine from the cooling tank drawn off over line 40 may alternatively be fed over line 40a, and thence directly into the spray drier 48, suitable valving being interposed in lines 40a, 40b and 45 to accomplish this as shown in the drawing. With such operation the damper 56 in flue 43 would of course be operated to the fully closed position to prevent flow of hot gases from flue 54 into the concentrator 41. Otherwise the operation of the FIG. 1a system would be as above described.

This alternative routing of the brine from the cooling tank 39 directly into the spray drier 47 is employed where additional concentration in concentrator 41 is not required prior to spray drying.

Referring now to FIG. 1b, the spray dried powder delivered from cyclont 52a into conduit 53 and comprising a powdered admixture of $MgCl_2$, MgO, etc., as tabulated above, is fed thence into a melter 70 for heating the powdered admixture to the molten state.

Melter 70 comprises a refractory lined steel tank 71, provided with a cover 72, into which conduit 53 extends through a sealing feed valve 73, such as a rotary star wheel valve. Within the tank the powdered admixture is rendered molten, as at 74, by passage of alternating electrical current between spaced, carbon rod electrodes 75, 76, energized from the A.C. generator 51a, via connections 74a, as indicated.

A pipe 78 extends through the cover 72 into the molten bath 74, the pipe being connected at its lower end to a pump 78a, driven by an electrical motor 78b, via a shaft 78c. Pipe 78 is connected to a pipeline 78d, which extends into the top of a chlorinator 80. By actuation of the pump 78a, the molten $MgCl_2$ and suspended particles of MgO is drawn off from the molten bath 74 and discharged into the top of the chlorinator. The pump may be operated continuously or intermittently depending on requirements. With intermittent operations no freezing of the molten $MgCl_2$ occurs in pipelines 78, 78d because on cessation of the pumping action the molten liquid in line 78 drains by gravity back into the molten bath 74, while that contained in line 78d drains similarly into the top of the chlorinator.

Chlorinator 80 comprises an upstanding steel housing 81, refractory lined as at 82, and an intermediate portion of the interior of which is packed with carbon blocks, coke or equivalent, as at 83. To start the chlorinator, it is heated by passage of electrical current through the carbon packing 83, supplied by and between spaced electrodes 84, 85, also energized from the A.C. generator output 51a, as indicated by connections 85a. A pipeline 86, having an interposed control valve 87, extends into the chlorinator near the base as shown for injecting chlorine gas therein.

In the operation of the unit, the molten $MgCl_2$ plus MgO containing liquid introduced via pipelines 78d, is sprayed into the top of the chlorinator, as at 88, and trickles down through the carbon packing 83, while chlorine gas is concurrently injected into the chlorinator base via pipeline 86 and passes upwardly through the hot molten liquid. As a result the MgO values are chlorinated to $MgCl_2$ in accordance with the following reaction:

$$MgO + Cl_2 + C \rightarrow MgCl_2 + CO$$

The MgO-free molten liquid collects at the bottom of the chlorinator into a pool 90, from whence it bows under gravity through a pipe 90a, into a refractory lined storage tank 90b, to provide a molten pool therein, as at 90c. A pump 90d, submerged in the pool, and driven by a motor 90e, via shaft 90f, pumps the liquid over a pipeline 90g into an electrolysis cell 92. The pump 90b may be operated continuously or intermittently depending on the electrolysis cell requirements as discussed below. If operated intermittently the molten liquid present in the pipeline 90g, will upon cessation of the pumping action, drain by gravity in part back into the molten pool 90c and in part into the electrolysis cell.

The electrolysis cell 92 may comprise a rectangular steel tank 93 lined with a thermally-insulating refractory 94. The top of the cell is made up of a number of precast shapes, as at 94a, which rest on the main cell structure (not shown) and which support a series of spaced pairs of cathodes, as at 95, 96, and interposed anodes, as at 97, energized from any suitable direct current source, as at 97a. This may be a D.C. generator driven by gas turbine 50, FIG. 1a, or by a similar turbine, or an A.C. to D.C. rectifier supplied by the A.C. generator 51. Interposed between each anode 97 and its associated pair of cathodes 95, 96 are a pair of semi-walls, as at 98, 99, for directing the chlorine and molten magnesium metal as fed from the molten salt bath 100, to the anodes and cathodes, respectively. During electrolysis, the molten magnesium metal rises to the surface of the fused salt bath and floats thereon, as at 101, from whence it is periodically removed. The chlorine gas rises into the spaces, as at 102, between the anodes and the semi-walls which dip into the bath as shown, and is drawn off through outlets, as at 103, provided in the sidewalls of the precast shapes in which the anodes are mounted, as at 104. The anodes 97 are made of graphite blocks, while the cathodes 95, 96 are steel castings, shaped to provide large parallel surfaces on opposite sides, respectively, of the interposed anode. Each cathode compartment, as at 24, is provided with a door (not shown) for removal of molten magnesium and sludge and for charging of magnesium chloride and adjustment of cell bath composition and volume. Fumes from the cathode compartment are drawn off through ports (not shown) in the back of each compartment, and chlorine gas is drawn off into a chlorine recovery system through the ports, as at 103, as explained above.

The electrolysis cell 92 shown in the drawing is of batch type operation involving periodic charging with molten magnesium chloride from the chlorinator 80. As an alternative there may be substituted the continuous flow type of electrolysis apparatus described in said F. E. Love application, Ser. No. 556,108.

Considering now the FIG. 2 embodiment of the invention with reference to FIG. 1a, in the latter figure the brine from Pond III is pumped into the desulfating reactor 18 along with $CaCl_2$ brine supplied over lines 19, 62a from the reactor 58 wherein $CaCl_2$ is produced by reacting the aqueous $CaCO_3$ slurry fed thereto over line 61 with the hot HCl containing gases supplied to the reactor via flue 57. In the FIG. 2 embodiment, this arrangement is dispensed with, and the aqueous $CaCO_3$ slurry is fed over a line 110 directly into the top of the first $MgCl_2$ brine concentrator 32 of FIG. 1a, and sprayed therein, as at 111. Also the $MgCl_2$-$MgSO_4$ containing brine drawn off from Pond III by pump 17 is fed over a line 112 directly to the inlet pipe 33 of the concentrator, from whence it is sprayed into the top of the concentrator, as at 34. Meantime, the hot HCl containing gases from flue 36 are fed into the base of the concentrator, as at 35, as in FIG. 1a, and in uprising counterflow to the descending sprays of the $CaCO_3$ slurry and the brine from Pond III. In consequence, the following reactions occur in the concentrator:

(1) $\quad CaCO_3 + 2HCl \rightarrow CaCl_2 + CO_2 + H_2O$ (2) $\quad MgSO_4 + CaCl_2 \rightarrow MgCl_2 + CaSO_4$ The desulfated and concentrated $MgCl_2$ brine thus produced together with the $CaSO_4$ precipitate formed discharge through the base of the concentrator via drain line 38 and into a settling tank 113, from the base of which the $CaSO_4$ slurry is drawn off via drain line 114. Meantime the hot, desulfated brine is drawn off from the top of the settling tank over line 115 by means of the interposed pump 116 and discharged into the cooling tank 39 of FIG. 1a. Aside from these changes the process of the FIG. 2 embodiment is the same as in the FIGS. 1a and 1b flowsheet.

What is claimed is:

1. The method for selective recovery of anhydrous magnesium chloride from sodium, potassium, magnesium, chloride and sulfate containing mixed salt solutions, which comprises: concentrating said solution in successive stages predominately to precipitate first sodium salts and thence potassium-magnesium double salts, cycling the mother liquor to a desulfating stage and desulfating with calcium chloride, cycling the desulfated liquor to an additional concentration stage and concentrating by passing in counterflow to hot gases therein, thence cooling to precipitate carnallite and residual NaCl values, cycling the resultant mother liquor to a spray drying stage and spray drying with hot entering gases at temperatures sufficiently high and on the order of 900–1000° F. to produce substantially anhydrous magnesium chloride powder and hot HCl containing off-gases, separating the two and cycling said off-gases to said gaseous concentration stage to provide the heated gases thereof, reacting the HCl contained in the off-gases from said concentration stage in an aqueous medium with calcium carbonate to produce an aqueous caluium chloride solution, and cycling said solution to said desulfating stage for desulfating the mother liquor thereat.

2. The method according to claim 1 which includes the further steps of dissolving the magnesium chloride values of said carnallite in water and combining with said resultant mother liquor.

3. The method according to claim 2 which includes the further steps of concentrating said combined mother liquor from said carnallite precipitation in an additional concentration stage by passing in counterflow to hot gases therein, and cycling the hot off-gases from said spray drying in part to said additional concentration stage to provide the hot gases thereof.

4. The method according to claim 1 wherein said desulfating and additional concentration stages are combined, and wherein the mother liquor from said double salt precipitation and said calcium carbonate are cycled to said combined desulfating and concentration stage and sprayed in counterflow to said hot gases thereat for concurrent desulfation and concentration of said mother liquor.

5. The method according to claim 1 which includes the additional steps of fusing said substantially anhydrous magnesium chloride and chlorinating while molten in the presence of carbon to convert magnesium oxide values therein to magnesium chloride.

6. The method according to claim 5 wherein said substantially anhydrous magnesium chloride is fused by heating with electrical power supplied from an electrical generator driven by a gas turbine, the hot off-gases from which are cycled to said spray drying stage for effecting said spray drying.

7. The method according to claim 3 wherein the off-gases from said spray drying are maintained at about 500–

700° F. and the off-gases from said gaseous concentration stage are maintained at about 200–250° F.

References Cited

UNITED STATES PATENTS

| | | | |
|---|---|---|---|
| 3,067,006 | 12/1962 | Ebert et al. | 23—91 |
| 3,099,528 | 7/1963 | Hadzeriga | 23—91 XR |
| 3,268,289 | 8/1966 | Macey | 23—91 XR |
| 3,275,409 | 9/1966 | Schubert et al. | 23—91 XR |
| 3,317,414 | 5/1967 | Fougner | 23—91 XR |
| 3,336,107 | 8/1967 | Kimberlin | 23—91 |
| 3,338,668 | 8/1967 | Lyons et al. | 23—91 |
| 3,346,333 | 10/1967 | Nadler | 23—91 |
| 3,432,258 | 3/1969 | Ferris | 23—91 |

EDWARD STERN, Primary Examiner

U.S. Cl. X.R.

23—89, 122, 128, 154, 201, 219; 204—70